United States Patent
Vollrath et al.

(10) Patent No.: US 9,557,880 B2
(45) Date of Patent: Jan. 31, 2017

(54) SHARED USER INTERFACE SERVICES FRAMEWORK

(71) Applicants: Ivo Vollrath, Walldorf (DE);
Klaus-Dieter Scherer, Dielheim (DE);
Petr Novak, Walldorf (DE); Michelle Braun, Bammental (DE)

(72) Inventors: Ivo Vollrath, Walldorf (DE);
Klaus-Dieter Scherer, Dielheim (DE);
Petr Novak, Walldorf (DE); Michelle Braun, Bammental (DE)

(73) Assignee: SAP SE, Walldorf (DE)

( * ) Notice: Subject to any disclaimer, the term of this patent is extended or adjusted under 35 U.S.C. 154(b) by 575 days.

(21) Appl. No.: 13/786,756

(22) Filed: Mar. 6, 2013

(65) Prior Publication Data

US 2013/0179797 A1 Jul. 11, 2013

Related U.S. Application Data

(63) Continuation of application No. 12/826,431, filed on Jun. 29, 2010, now Pat. No. 8,418,074.

(51) Int. Cl.
*G06F 3/048* (2013.01)
*G06F 3/0481* (2013.01)
*G06F 9/54* (2006.01)

(52) U.S. Cl.
CPC .............. *G06F 3/0481* (2013.01); *G06F 9/54* (2013.01); *G06F 2209/541* (2013.01)

(58) Field of Classification Search
CPC .... G06F 9/54; G06F 2209/541; G06F 9/4443; G06F 8/38; G06F 8/36; G06F 8/20

USPC .......................................................... 715/703
See application file for complete search history.

(56) References Cited

U.S. PATENT DOCUMENTS

| | | | |
|---|---|---|---|
| 7,000,238 B2 | 2/2006 | Nadler et al. | |
| 7,549,117 B2 * | 6/2009 | Chan et al. ........... | G06F 17/246 715/217 |
| 7,574,511 B2 | 8/2009 | Pujol et al. | |
| 7,624,145 B2 | 11/2009 | Junuzovic et al. | |
| 7,685,561 B2 | 3/2010 | Deem et al. | |
| 7,739,691 B2 | 6/2010 | Elvanoglu et al. | |
| 7,757,205 B2 | 7/2010 | Heller et al. | |

(Continued)

OTHER PUBLICATIONS

Kassoff et al., "Creating GUIs for Web Services", IEEE Internet Computing, Sep.-Oct. 2003, pp. 66-73.

(Continued)

*Primary Examiner* — Namitha Pillai
(74) *Attorney, Agent, or Firm* — Fish & Richardson P.C.

(57) ABSTRACT

This disclosure provides various embodiments for providing UI services. An application-independent, reusable UI framework receives a request from a first application, to perform a first operation on a first set of data relating to presentation of the first set of data on a UI. A subset of the first set of data is received from a data provider independent of the UI framework. At least one first service is identified in response, the first service hosted by the UI framework and adapted to perform the first operation on the first set of data. The first operation is performed on the subset of the first set of data using the at least one identified first service to produce a first processed set of data adapted for presentation on a UI of the first application. The first processed set of data is sent to the first application.

25 Claims, 11 Drawing Sheets

(56) References Cited

U.S. PATENT DOCUMENTS

| | | | |
|---|---|---|---|
| 7,895,338 B2 | 2/2011 | Leaute et al. | |
| 8,533,723 B1* | 9/2013 | Badenell et al. | 718/104 |
| 2003/0208595 A1* | 11/2003 | Gouge et al. | 709/225 |
| 2004/0187140 A1* | 9/2004 | Aigner et al. | 719/328 |
| 2006/0179065 A1* | 8/2006 | Xu | 707/100 |
| 2008/0028329 A1 | 1/2008 | Erl | |
| 2010/0122065 A1* | 5/2010 | Dean et al. | 712/203 |
| 2010/0146420 A1 | 6/2010 | Bharadwaj et al. | |
| 2011/0320970 A1 | 12/2011 | Charrad et al. | |

OTHER PUBLICATIONS

Hou et al., "Research on the UI Integration Architecture of Service System", IEEE Communication Society—ICC 2008 Proceedings, pp. 5526-5531.

* cited by examiner

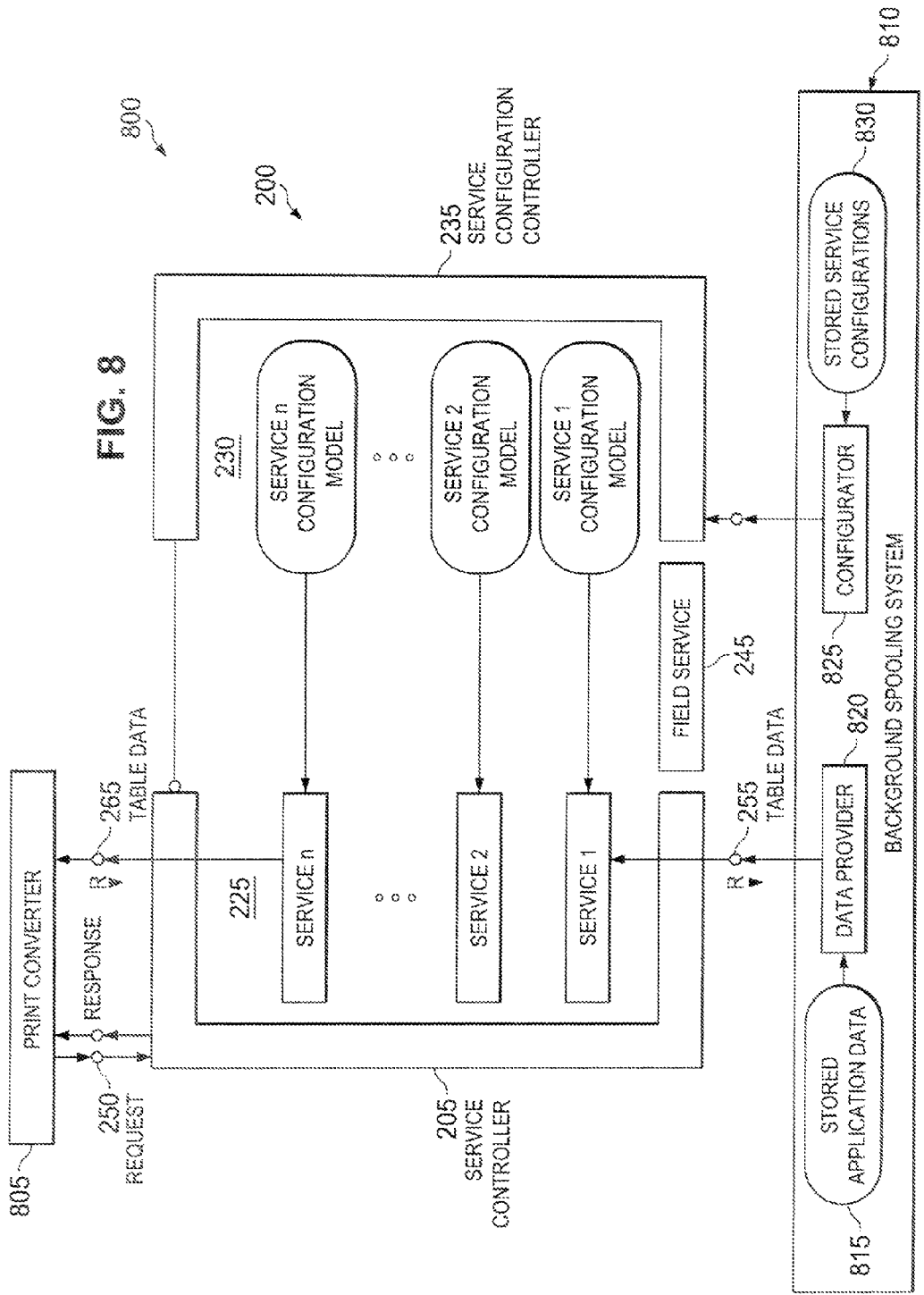

SHARED USER INTERFACE SERVICES FRAMEWORK

TECHNICAL FIELD

This present disclosure relates to user interface operations, and, more particularly, to systems, software, and computer-implemented methods for providing user interface functionality through a shared user interface framework.

BACKGROUND

User interface elements can be displayed by a graphical user interface of a computing device and interacted with by users of the device. It is common, in modern software applications for the application to have, associated with it, at least one such user interface element or "UI." Users can interact with a program's UI affecting a change in the UI displayed to the user. One example of a UI are table UIs adapted to allow users to interact with table data through common table UI operations such as sorting, filtering, grouping, expanding, and performing analytical calculations on data displayed in the table UI.

Modern software application developers have a myriad of UI technologies to choose from when designing and building an application and its corresponding UI, and the available selection of UI technologies continues to expand. UI technologies include Adobe Flash, JavaScript+html, XUL, SwixML, Thinlet, Buoy, Swing, IBM's AWT, and others. As new UI technologies are developed, they sometimes replace older UI technologies, prompting application developers to redesign software systems to incorporate the latest UI technology.

Advances in software development, distributed software environments and Service Oriented Architectures (SOA) have led to many advancements in service-based software architectures. SOA is an architectural style for building software applications that use services exposed to applications over a network. The internet has allowed implementations of web-based SOA environments, or web services that deliver services over the web using technologies such as XML, WSDL, SOAP, and UDDI. SOA generally promotes reusability of software resource and loose coupling between software components. Applications in SOA are built based on services. A service is an implementation of a well-defined business functionality, and such services can then be consumed by clients in different applications or business processes. One example is SAP's Business Intelligence Consumer Services™ product which can expose services for use in connection with other applications such as SAP's Business Explorer™.

SUMMARY

This disclosure provides various embodiments for providing UI services on behalf of a software application. An application-independent, reusable UI framework receives a request from a first application, to perform at least one first operation on a first set of data relating to presentation of the first set of data on a user interface associated with the first application. A subset of the first set of data, corresponding to the request, is received from a data provider independent of the UI framework. At least one first service is identified, in response to the request, the first service hosted by the UI framework and adapted to perform the at least one first operation on the first set of data. The first operation is performed on the subset of the first set of data using the at least one identified first service to produce a first processed set of data adapted for presentation on the user interface of the first application. The first processed set of data is sent to the first application.

While generally described as computer implemented software that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 8 is a schematic illustration of an example shared UI framework used in connection with an example print converter application.

Like reference symbols in the various drawings indicate like elements.

DETAILED DESCRIPTION

This disclosure generally describes software, computer-implemented methods, and systems relating to a reusable, software-architecture-independent user interface (UI) framework that can be integrated into an application's architecture stack to provide shared functionality for the configuration and execution of user-interface-related operations on the application. For instance, the UI framework can encapsulate and provide a shared, central set of commonly used table operations (e.g., filtering, sorting, grouping, expanding/hiding rows, columns, and cells, etc.) and services that can be reused in the architecture stacks of distinct and varied applications, including applications using different UI formatting protocols, designs, and technologies. Rather than forcing a developer to building these common functionalities into an application's UI each time a new application or new version is developed, a shared UI framework can simplify development of an application UI by allowing the developer to access UI services exposed through the shared UI framework and integrate the services' functionality into the developer's own UI design. Moreover, because the shared UI framework is largely application- and UI-technology-independent, developers can easily migrate to new or different UI technologies without having to redevelop the UI operation functionality provided through the UI framework.

Distributed software environments, including SOA systems, enterprise software systems, and cloud-based software systems can also make use of a shared UI framework. Indeed, in some instances, several distinct software applications in a distributed computing environment may seek to access, edit, or otherwise use data from one or more data sources, including data sources external to the applications, such as a centralized database. A UI framework can interface directly with the source of the data designated for display in an application's UI. The UI framework's ability to interface with a wide variety of data sources and service consumers permits the UI framework to be widely reused across a myriad of applications and data types. A developer desiring to incorporate certain UI operations within the UI architecture of the developer's project can simply subscribe to, piggy-back, interface with, or otherwise access the shared UI services provided by an application-independent UI framework to realize the desired UI functionality without having to engineer and program the functionality from scratch. A UI framework can offer built-in support for a number of UI concepts and operations commonly used by different UI interface technologies, such as table UI operations.

Figure 1:
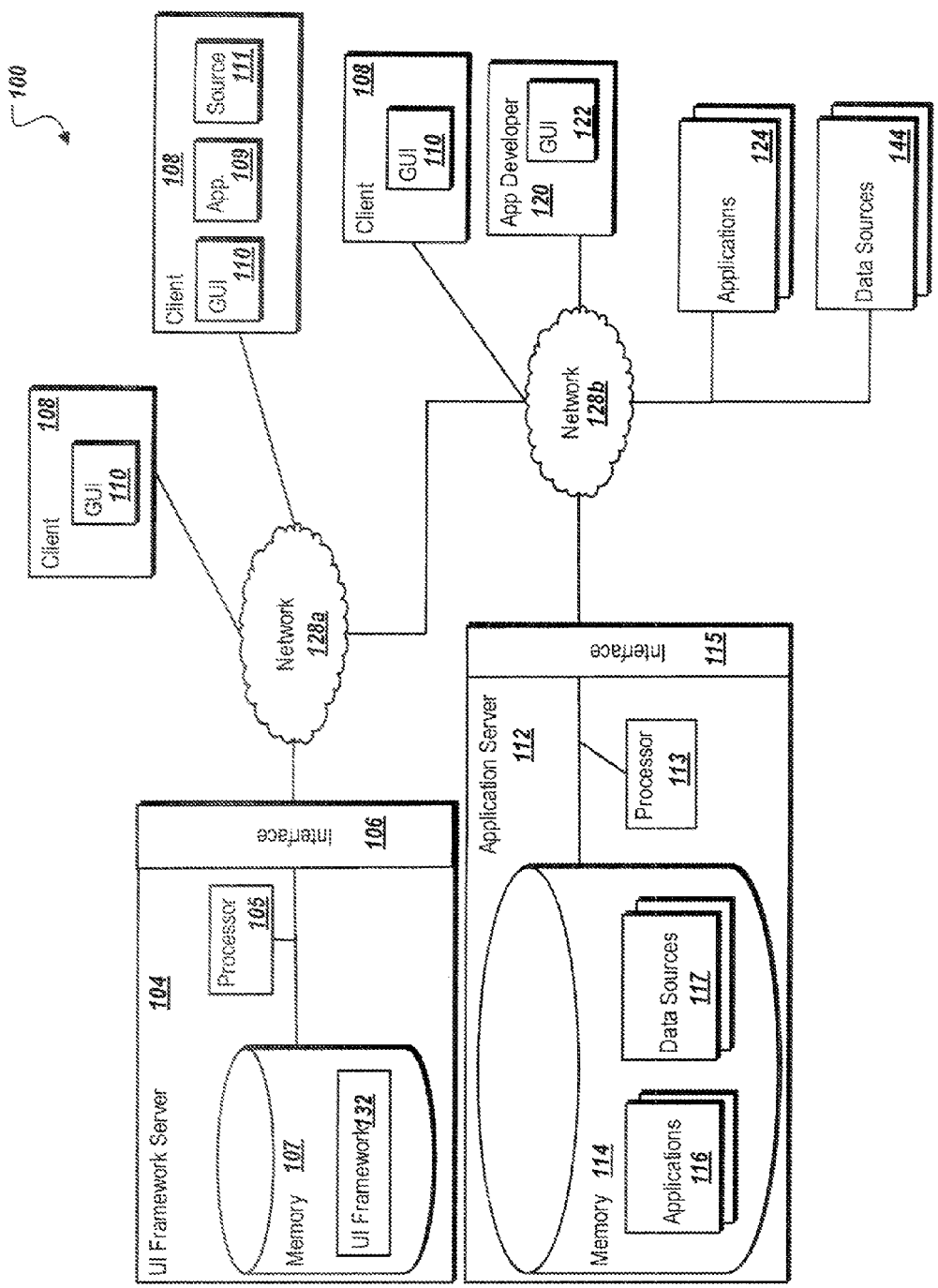
FIG. 1 illustrates an example system for providing a shared UI framework to one or more UI service consumers.

Turning to the example implementation of FIG. 1, the illustrated software environment 100 includes, or is communicably coupled with, one or more clients 108, a UI framework server 104, one or more application servers 112, one or more application developers 120, one or more external software applications 124, and one or more other external data sources 144, using one or more networks 128. Each of the servers 104, 112 comprise electronic computing devices operable to receive, transmit, process, store, or manage data and information associated with the software environment 100. As used in this document, the term "computer" is intended to encompass any suitable processing device. For example, the environment 100 may be implemented using computers other than servers, including a server pool. Further, any, all, or some of the servers 104, 112 may be adapted to execute any operating system, including Linux, UNIX, Windows Server, or any other suitable operating system. In the illustrated embodiment, the UI framework 104 is one or more computing devices used to provide a reusable UI framework 132, via the network 128, to one or more applications, including applications hosted by an application server (e.g., 112), stored locally on a client (e.g., 109), and other applications 124. Clients 108, as well as other users external to environment 100, can, directly or indirectly (e.g., via a proxy, virtual machine interface, etc.) access and perform operations on data provided by a data source 117, 144. It will be understood that the term "application server" (e.g., 112) can include any suitable software component or module, or computing device(s) capable of hosting and/or serving a software application, including distributed, enterprise, or cloud-based software applications.

In the present example, the UI framework server 104 and the application server 112 each include at least one interface (106 and 115, respectively), one or more processors (105 and 113, respectively), and computer-readable memory (107 and 114, respectively). In some instances, the UI framework server 104 and one or more application servers 112 can be hosted on a common computing system, server, or server pool, and share computing resources, including shared memory, processors, and interfaces. The interfaces 106, 115 are used for communicating with other systems in a client-server or other distributed environment (including within environment 100) connected to the network 128, for example the one or more clients 108, an application developer 120, or any other computing device adapted to interface with the servers 104, 112, including devices not illustrated in FIG. 1. Generally, each interface 106, 115 comprises logic encoded in software and/or hardware in a suitable combination and operable to communicate with the network 128. More specifically, the interfaces 106, 115 may comprise software supporting one or more communication protocols associated with communications such that the network 128 or hardware is operable to communicate physical signals within and outside of the illustrated software environment 100.

Each of the example servers 104, 112 also includes a processor (105, 113 respectively). Each processor 105, 113, and 117 executes instructions and manipulates data to perform the operations of the associated server 104, 112, and may comprise, for example, a central processing unit (CPU), a blade, an application specific integrated circuit (ASIC), or a field-programmable gate array (FPGA), among other suitable options. Although each processor 105, 113 is illustrated as a single processor, multiple processors may be used according to the particular needs of the associated server. References to a single processor 105, 113 are meant to include multiple processors where applicable. The operations that each processor 105, 113 executes are determined by the purpose and operations of its associated server. Generally, the processor 105, 113 executes instructions and manipulates data to perform the operations of its respective server and, specifically, the software systems and applications (e.g., 116, 124) hosted by the server.

At a high level, each "server" (e.g., 104, 112) includes one or more electronic computing devices operable to receive, transmit, process, store, or manage data and information associated with the environment 100. Specifically, a server is responsible for receiving requests from one or more clients and sending the appropriate response the requesting client. In addition to requests from external clients, requests may also be sent from internal users, external or third-party customers, other automated applications, as well as any other appropriate entities, individuals, systems, or computers. For example, although FIG. 1 illustrates a single server for each of the UI framework server 104 and application server 102, a server can be implemented using two or more servers, as well as computers other than servers, including a server pool. Indeed, a server may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, illustrated server 102 may be adapted to execute any operating system, including Linux, UNIX, Windows, Mac OS, or any other suitable operating system.

In the case of an application server 112, the processor 113 can execute the functionality required to receive and respond to requests from the clients 108, as well as client applications 124 interfacing with the server's hosted application 116. Regardless of the particular implementation, "software" may include computer-readable instructions, firmware, wired or programmed hardware, or any combination thereof on a tangible medium operable when executed to perform at least the processes and operations described herein. Indeed, each software component may be fully or partially written or described in any appropriate computer language including C, C++, Java, Visual Basic, assembler, Perl, any suitable version of 4GL, as well as others. Applications can be implemented as individual modules that implement the various features and functionality through various objects, methods, or other processes, or may instead include a number of sub-modules, third party services, components, libraries, and such, as appropriate. Conversely, the features and functionality of various components can be combined into single components as appropriate.

At a high level, each of the one or more hosted applications (e.g., 109, 116, 124) illustrated in the environment 100 can include any application, program, module, process, or other software that may execute, change, delete, generate, or otherwise manage information according to the present disclosure, particularly in response to and in connection with one or more requests received from the illustrated clients 108, as well as other applications. In certain cases, only one hosted application may be located at a particular server. In others, a plurality of related and/or unrelated hosted applications may be stored at a single server, or located across a plurality of other servers, as well. In certain cases, environment 100 may implement a composite hosted application. For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET, among others. Additionally, the applications 116, 124 may represent web-based applications accessed and executed by remote clients 108 or client applications 124 via the network 128 (e.g., through the Internet). Further, while illustrated as internal to server 112, one or more processes associated with a particular hosted application 116 may be stored, referenced, or executed remotely. For example, a portion of a particular hosted application 116 may be a web service associated with the application that is remotely called, while another portion of the hosted application 116 may be an interface object or agent bundled for processing at a remote client 108. Moreover, any or all of the hosted applications 116 may be a child or sub-module of another software module or enterprise application (not illustrated) without departing from the scope of this disclosure. Still further, portions of the hosted application 116 may be executed by a user working directly at server 112, as well as remotely at client 108.

Similarly, the UI framework server 104 can include one or more processors 105 executing software comprising the UI framework 132. The processor 105 executes instructions and manipulates data to perform UI framework operations and tasks (described below) as well as serve UI services to a plurality of UI service consumers, including applications (e.g., 109, 116, 124), systems, and programs remote from the UI framework server 104. The UI framework server 104 can be adapted to serve the UI framework to consumers in a variety of contexts including local, private, distributed, enterprise, and cloud-computing software system environments. The UI framework server 104 can be implemented using a single processor 105 or multiple processors, including multiple processors operating in a parallel processing computing environment.

Each of the example servers 104, 112, and 116 also includes a memory (107 and 114, respectively). Each memory may include any memory or database module and may take the form of volatile or non-volatile memory including, without limitation, non-transitory memory elements, magnetic media, optical media, random access memory (RAM), read-only memory (ROM), removable media, or any other suitable local or remote memory component. Each memory may store various objects or data, including classes, frameworks, applications, backup data, business objects, jobs, web pages, web page templates, database tables, content repositories storing business or other dynamic information, or other information including any parameters, variables, algorithms, instructions, rules, constraints, or references thereto relevant to the purposes of the particular server. Each memory may also include any other appropriate data, such as VPN applications, firmware logs and policies, firewall policies, a security or access log, print or other reporting files, as well as others. Again, the particular data and instructions stored in each memory 107, 114 will be described in detail below in connection with the illustrated implementations of the software environment 100 and components thereof.

Generally, the network 128 facilitates wireless or wireline communications between the components of the software environment 100 (i.e., between the UI framework server 104 and one or more application servers 112, an application developer 12, and clients 108, as well as between the other components as appropriate), as well as with any other local or remote computer, such as those associated with the one or more applications 124 or external data sources 144. The network 128 can be implemented as one or more distinct networks. In any implementation, the network 128 may be a continuous or discontinuous network without departing from the scope of this disclosure, so long as at least a portion of the network 128 may facilitate communications between senders and recipients. The network 128 may be all or a portion of an enterprise or secured network. As an example, in FIG. 1 networks 128b may represent a portion of an enterprise network, while network 128a may represent a connection to the Internet. In some instances, a portion of the network 128 may be a virtual private network (VPN), such as, for example, the connection between the application developer 120 and the application server 112. All or a portion of the network 128 can comprise either a wireline or wireless link. Example wireless links may include 802.11a/b/g/n, 802.20, WiMax, and/or any other appropriate wireless link. In other words, the network 128 encompasses any internal or external network, networks, sub-network, or combination thereof operable to facilitate communications between various computing components inside and outside the illustrated environment 100. The network 128 may communicate, for example, Internet Protocol (IP) packets, Frame Relay frames, Asynchronous Transfer Mode (ATM) cells, voice, video, data, and other suitable information between network addresses. The network 128 may also include one or more local area networks (LANs), radio access networks (RANs), metropolitan area networks (MANs), wide area networks (WANs), all or a portion of the Internet, and/or any other communication system or systems at one or more locations.

The illustrated implementation of FIG. 1 includes one or more local and/or remote clients 108. The client 108 is any computing device operable to connect or communicate at least with the application server 104 and/or the network 128 using a wireline or wireless connection. Each client 108 includes a GUI 110. In general, the client 108 comprises an electronic computing device operable to receive, transmit, process, and store any appropriate data associated with the software environment of FIG. 1. It will be understood that there may be any number of clients 108 associated with environment 100, as well as any number of clients 108 external to environment 100. Further, the term "client" and "user" may be used interchangeably as appropriate without departing from the scope of this disclosure. Moreover, while each client 108 is described in terms of being used by one user, this disclosure contemplates that many users may use one computer or that one user may use multiple computers. As used in this disclosure, the client 108 is intended to encompass a personal computer, touch screen terminal, workstation, network computer, kiosk, wireless data port, smart phone, personal data assistant (PDA), one or more processors within these or other devices, or any other suitable processing device. For example, the client 108 may comprise a computer that includes an input device, such as a keypad, touch screen, mouse, or other device that can accept information, and an output device that conveys information associated with operations of one or more applications stored and/or executed on the application server 112 (or other servers in environment 100) or on the client 108 itself, including digital data, visual information, or the GUI 110. Both the input device and the output device may include fixed or removable storage media such as a magnetic computer disk, CD-ROM, or other suitable media to both receive input from and provide output to users of the clients 108 through the display, namely the GUI 110.

The GUI 110 comprises a graphical user interface operable to allow the user to interface with at least a portion of environment 100 for any suitable purpose, including allowing a user to interact with one or more software applications (e.g., 109, 116, 124). Generally, the GUI 110 provides users with an efficient and user-friendly presentation of data provided by or communicated within the system. The term "graphical user interface," or GUI, may be used in the singular or in the plural to describe one or more graphical user interfaces and each of the displays of a particular graphical user interface. Therefore, the GUI 110 can be any graphical user interface, such as a web browser, touch screen, or command line interface (CLI) that processes information in the environment 100 and efficiently presents the results to the user. In general, the GUI 110 may include a plurality of user interface (UI) elements such as interactive fields, pull-down lists, media players, tables, graphics, virtual machine interfaces, buttons, etc. operable by the user at the client 108. These UI elements may be related to the functions of one or more applications (e.g., 116, 124), including applications 109 hosted at the client.

While FIG. 1 is described as containing or being associated with a plurality of elements, not all elements illustrated within environment 100 of FIG. 1 may be utilized in each alternative implementation of the present disclosure. Additionally, one or more of the elements described herein may be located external to environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Figure 2:
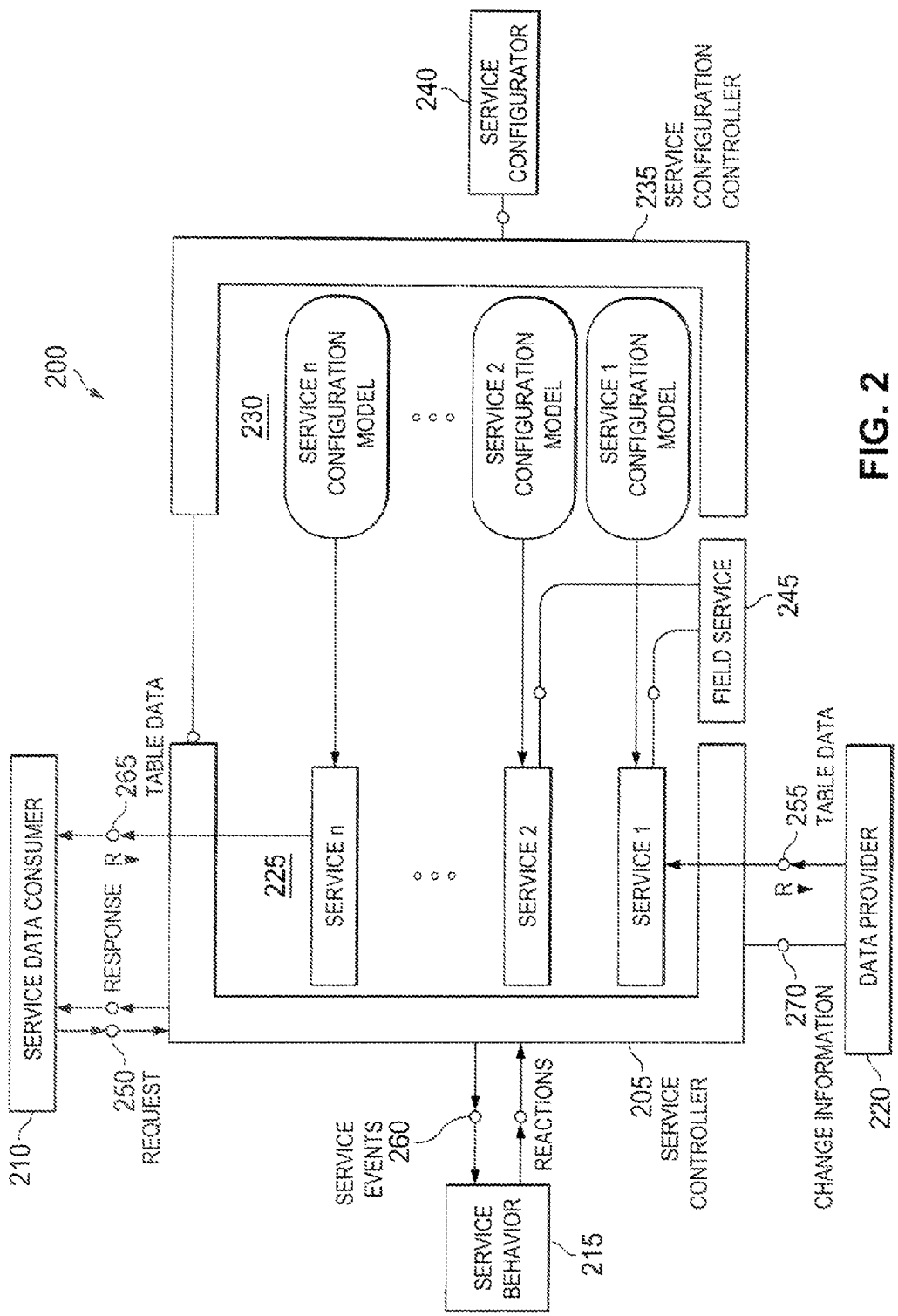
FIG. 2 is a schematic illustration of an example shared UI framework.

Turning now to FIG. 2, a schematic representation of an example implementation of a UI framework 200 is illustrated. The UI framework 200 includes a service controller 205 managing interactions of the UI framework 200 with service data consumers 210, service behavior controllers 215, and data sources 220. The service controller 205 also manages the delivery and performance of UI operations provided by one or more UI services 225 offered through the UI framework 200. The UI services 225 can each provide a particular UI operation on data 255 accessed from a data source 220 by the UI framework 200. Each UI service 225 can have a corresponding service configuration model 230. A service configuration model 230 defines the exact function of a service and parameters for the corresponding service's operation on data intended for the service consumer's 210 UI. The UI framework 200 further includes a service configuration controller 235 that interfaces with service configurators 240, allowing individual service configurators 240 to provide service configuration customization requests to customize particular service configurations 230 in accordance with, for example, the particular needs of a UI or the UI's underlying application. The UI framework 200 can also include a field service controller 245 adapted to handle all aspects of data conversion needed in adapting data 255 provided by the data source 220 for use by the services 225 and, upon processing by the services, use by the service data consumer 210.

The service controller 205 can be adapted to manage and guarantee the consistent configuration and execution of the individual UI services 225 provided by the UI framework 200. Additionally, in some instances, the service controller can provide interfaces to, or be the interface to, one or more external components utilizing services provided by the UI interface or external components contributing towards the operation of the UI framework 200. Services can be exposed to external components via one or more APIs. Examples of external components can include service data consumers 210, data sources 220, and service behavior requests 215. In general, the service controller 205 can receive requests 250 from a service consumer 210 to perform certain operations on data to be displayed on a UI associated with the service consumer 210. The service controller 205 identifies a data source 200, corresponding to the request 250, to which one or more UI operations are to apply. The service controller 205 identifies and retrieves the particular data 255 needed for fulfilling the consumer's UI operation and request. The service controller 205 can further interpret the request 250 to identify one or more services 225 providing functionality needed to perform the operation and complete the request 250 on the identified data 255. Each UI service 225 corresponds to and performs at least one operation on data for use in display by a UI associated with the service consumer 210. Examples of UI services 225 include sorting, filtering, grouping, aggregation, concatenation, analytical functions, math functions, data expansion, hiding, exporting data to external applications or file formats, and format conversion.

The execution of some services 225 can change the order of table rows and columns, compared to the order of the original data stored and/or managed by its data source 220. Some services can also remove, or filter portions of data (such as a row or column in a table) as well as create new "virtual" data such as headings and grouping rows. The service controller 205 can manage the "movement" of data as it proceeds from the data source 220 through processing by one or more services 225. For instance, in table data, the service controller 205 can manage selections of one or multiple rows, columns, and cells and provides methods to map such selections between the data consumer UI perspective and the data source's perspective. The service controller 205 can also rely, in some instance, on the individual services 225 to perform some of this management. For instance, services 225 can be responsible for retaining the selection information when the service configuration changes and to keep the mapping information consistent.

Figure 3A:
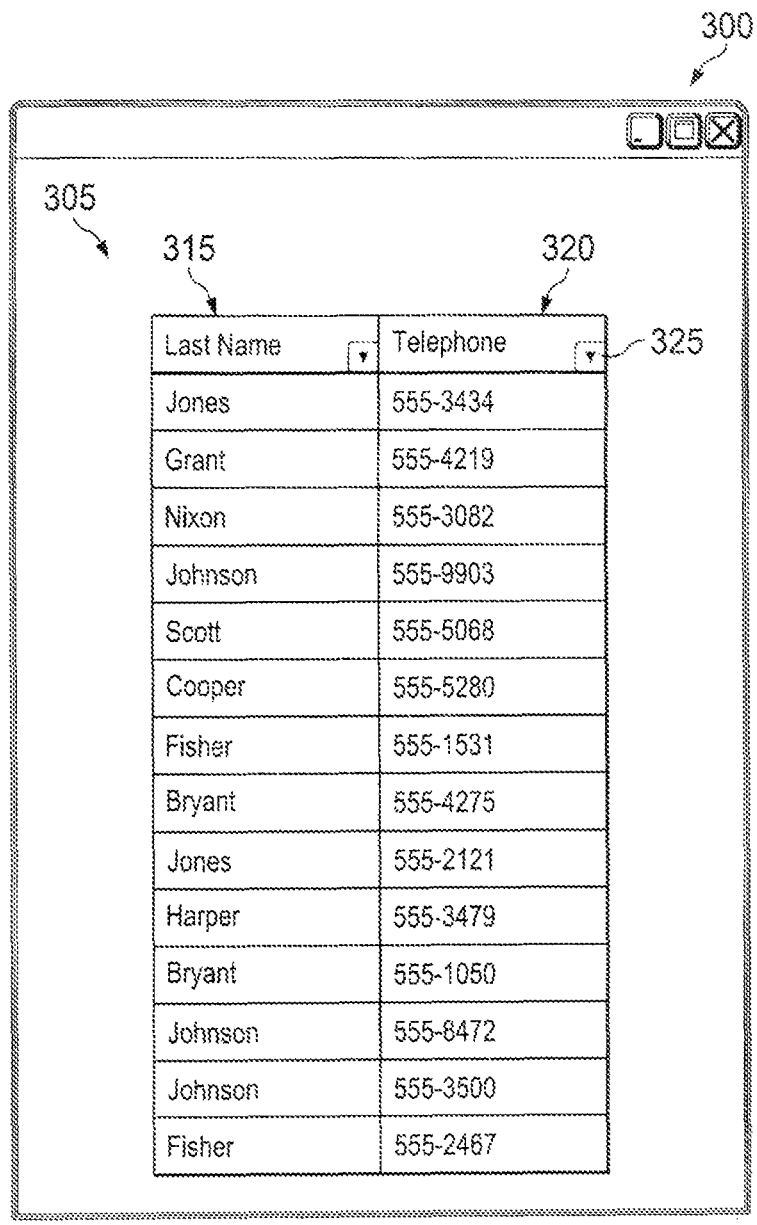
FIG. 3A is an example screenshot of a user interface displaying example table data capable of being operated upon by a shared UI framework, such as the UI framework described in connection with FIG. 2.
Figure 3B:
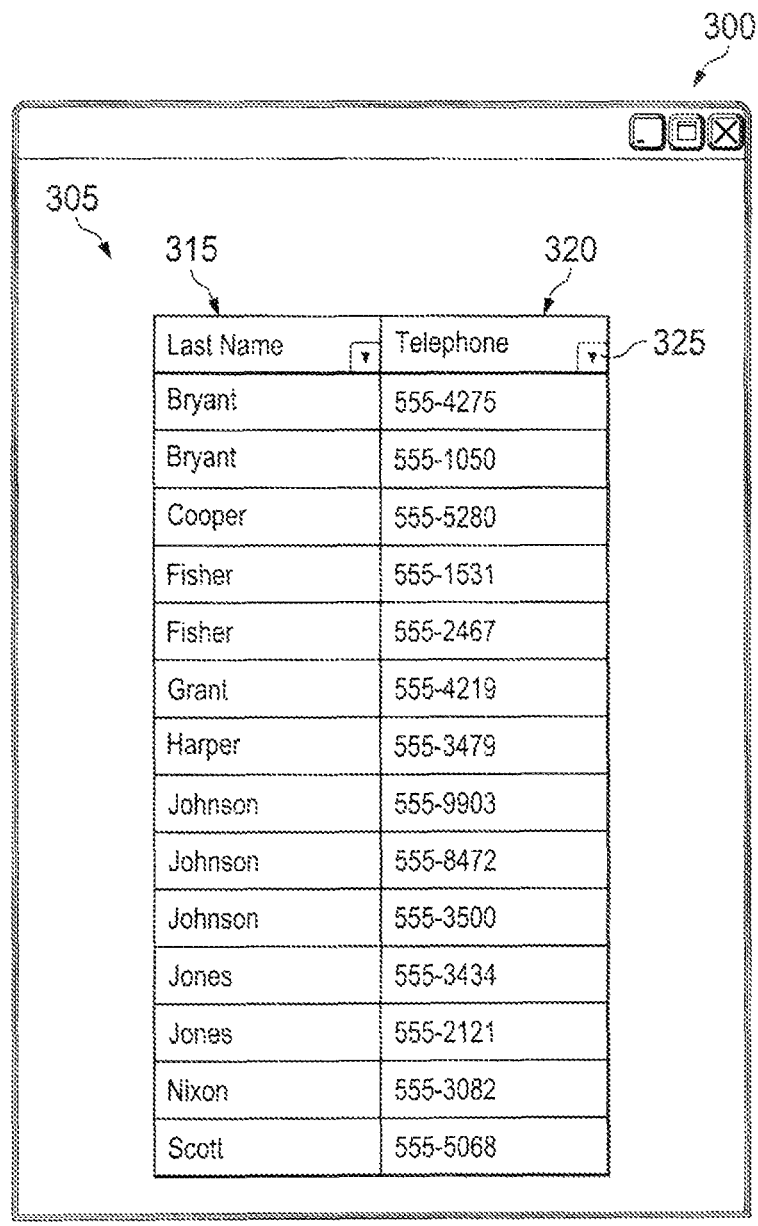
FIG. 3B is an example screenshot of a user interface displaying example table data that has been operated upon by a shared UI framework, such as the UI framework described in connection with FIG. 2.
Figure 3C:
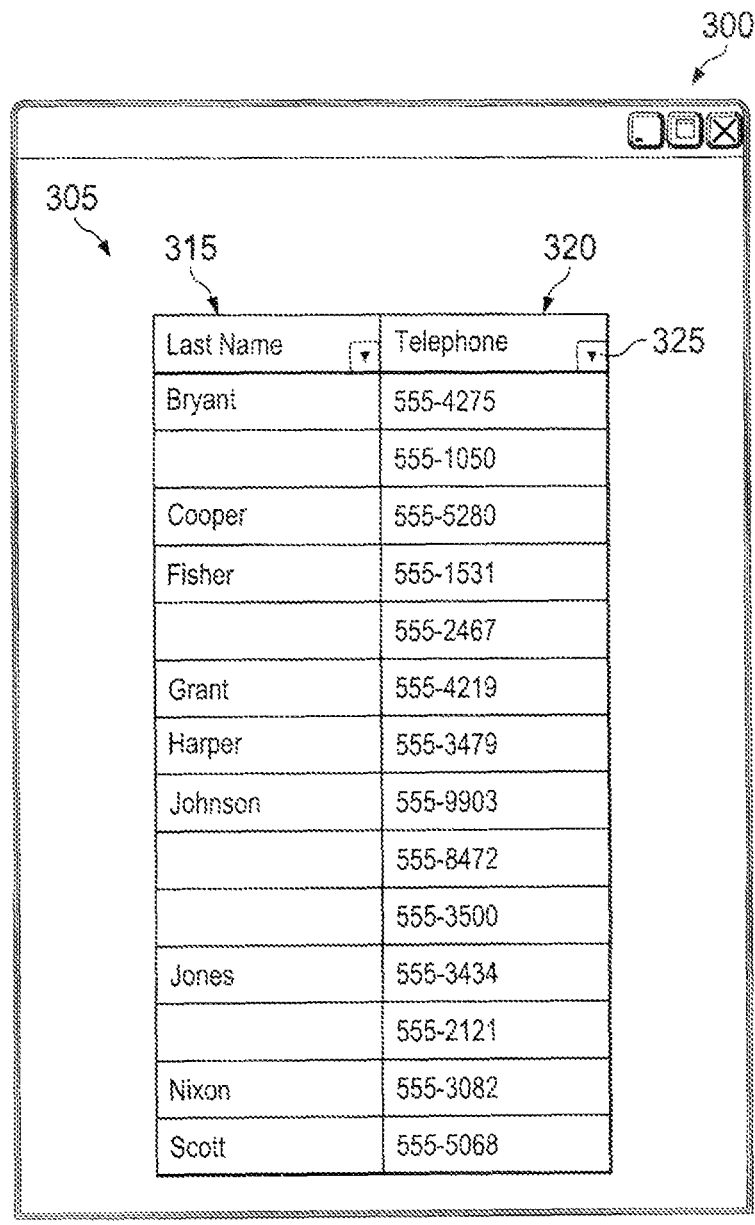
FIG. 3C is an example screenshot of a user interface displaying another example of table data that has been operated upon by a shared UI framework, such as the UI framework described in connection with FIG. 2.

A single UI service 225 may be sufficient to perform the operation responsive to the service consumer's request 250, although in some instances, multiple UI services 225 will need to be called to complete an operation responsive to the request 250. Additionally, where multiple services are to be called, the service controller 205 can, in addition to identifying and selecting the appropriate services 225, orchestrate the manner and order in which each of the identified services 225 performs its respective operation on the data. Indeed, in some instances, it can be necessary to perform services 225 in a particular order in order to produce a result responsive to the service consumer's request 250. As an example, the UI framework can provide functionality for providing table UI operations. FIGS. 3A-3C illustrate examples of a table 305 displayed on a UI 300. In this example, the table data is a two-column list of names 315 and telephone numbers 320. The table data can be retrieved from a data source (e.g., 220), including local and/or remote data sources, as well as data sources internal to or external to an application or other service consumer. The illustrated example of a table 305 is to be understood as a simple example provided solely for purposes of non-limiting illustration. Indeed, the content, organization, size, and format of the table data can be essentially limitless in variety and scope.

Continuing with the example of FIG. 3A, in some instances an application's or program's table UI may allow the user to sort or group records or rows in the table, for instance, alphabetically, in descending or ascending order, or according to some other convention by selecting, for example, a button 325, displayed with the table 305. In the example of FIG. 3B, a user has interacted with the UI 300 to indicate the user's desire to sort the table 305 of table data alphabetically according to name. Rather than requiring the developer of the UI's 300 associated program to develop and integrate the table UI functionality into the program's own, dedicated UI layer, the sort operation performed on the list (as shown in FIG. 3B) can be performed through a call, by the UI's associated program (the service consumer, in this example), to a shared, technology-independent UI framework, such as the UI framework illustrated and described in connection with FIG. 2.

In the alternative example of FIG. 3C, a grouping operation has been requested by a user, through the UI 300, on the list table data 305 to group the telephone numbers according to last name. In this particular example, the grouping command has also been performed through a call to a shared UI framework. Further, in this example, the UI framework can implement performance of the grouping operation request as a two-step service call. First, a sort operation through an identified sort service can be performed on the data 305 to arrange the names data in alphabetical order, and thereby ordering the list data so that common names are vertically adjacent in the column. For instance, "Jones" "555-3434" is adjacent to "Jones" "555-2121." This prepares the data for a simplified grouping service, performed in a second step, to complete the consumer's requested grouping operation. In this example, a service controller (e.g. 205) can be used to determine that this particular grouping operation is performed using a combination of a sort service and a group service, in that order, hosted by the UI framework. The service controller can further manage the order the services are called and pass data, ensuring that the sort service performs its associated operation first and passes the sorted table data to the grouping service for further processing. The service controller can, itself, act as the intermediary between services, ensuring that data is properly processed and in the correct order.

Returning to the example illustrated in FIG. 2, the service controller 205 can further manage the performance of service operations on UI data so as to optimize performance of the requested operations. For instance, a shared UI framework 200 can provide UI functionality for several service consumers 210, for instance, in connection with an enterprise software service or environment. Sharing a UI framework 200 among multiple consumers 210 can impose heavy processing loads on the UI framework 200, as the UI framework fields and responds to multiple operation requests from service consumers 210. In some instances, certain operations capable of being provided by one of the UI services in furtherance of a UI operation request 250 can also be performed by certain data sources 220. As one example, a data source 220 can be a database table managed by a particular database management system (DBMS). For instance, the database management system can be a SQL DBMS and include functionality for performing certain SQL functions on the requested data. Some of these functions can perform operations that are redundantly provided by UI services 225 in the UI framework 200, such as sorting, filtering, and grouping operations, as well as others.

As one example, a service consumer 210 can request that the UI framework 200 perform a grouping and data conversion operation on data from a data source 220. In this example, the service controller 205 identifies the data source 220 as well as the capability of the data source to perform elements of the requested grouping operation. The UI framework may further determine that the capabilities of the data source 220 are suitable substitutes for certain services 225 that could be used to respond to the request 250. To conserve processing resources at the UI framework 200, the service controller can delegate the performance of certain operations, capable of being performed by the UI service 225, to a data source 220 capable of performing the same operations on the data 255. Additionally, the UI framework 200 can delegate UI operations in order to increase the overall efficiency of the response to a request 250. As an example, many UI operations can be implemented more efficiently if their execution is located "close" to the respective data source 220, such as by the data source 220 itself. Accordingly, the UI framework 200 may determine that it is preferable, from an efficiency standpoint, to delegate certain operations or services to the data source 220, where the data source 200 is available to perform these operations.

Delegating operations to the data source 220 can be optional. For instance, a service controller 205 may first seek permission from the data source 220 or determine a load on the UI framework before delegating UI operations to the data source 220. In some instances, a data source 220 may perform UI operations requested of it by the service controller 205, prior to transmitting the data 255 to the UI framework 200 for further processing. Additionally, in certain instances, the UI framework can delegate all of the UI operations needed to respond to a request 250 to a data source. In the example above, involving a request to group and convert table data, the service controller 205 communicates with the data source 220 and requests that the data source provide the requested data 255, operated upon by the data source 220 and grouped according to the parameters set forth in the request 250. The service controller 205 receives the processed data 255 and need only then manage the execution of those remaining services 225 needed to complete the data conversion portion of the request 225. In some examples, operations performed by a data source 220 on data 255 delivered to the UI framework 200 for further processing may need to be "finished," or specially processed, by one or more services 225 capable of working with data that has been operated upon by a particular data source 220.

In addition to optimizing performance of the UI framework services 225 by delegating certain operations to a capable data source 220 when available, the service controller 205 can also be responsible for communicating with service behavior controllers 215. A service behavior controller 215 can specify and communicate the needs and conventions of a particular UI, on an operation-by-operation, or service consumer-by-service consumer basis. The service controller 205, can request 260 service behavior data from a service behavior controller as particular service events (e.g., a particular operation) are identified or performed. For instance, a particular UI of the service consumer 210 may only display a portion of a set of data on the UI at any given time. For example, the service consumer's UI may utilize a scrolling tool, displaying less than the entire data set, yet allowing the user to view the remaining data by interacting with the UI. Further, only a subset of data to be processed and returned 265 for display on the UI may be displayed at one time. However, in some instances, performance of a UI operation on data presented to a user can result in a change to the order or arrangement of the data as it was originally presented to a user. For instance, a sort or filter operation can re-order data. A service behavior, specified by a service behavior controller 215, can establish what portion of the data is displayed following the operation. For instance, in the example of a sort, a service behavior can dictate that following the sort, a user-selected row or top row of the table last displayed to the user, is to be positioned at the top of the set of returned data 265, even if the particular row is not the first, or "top" row of the data set after it has been sorted (e.g., alphabetically). As another example, in the case of a filter operation, certain rows may be hidden by virtue of the filter. A service behavior can dictate whether certain previously selected rows remain selected, whether only the remaining visible selected rows remain selected, or no row remains selected after filtering.

Figure 4A:
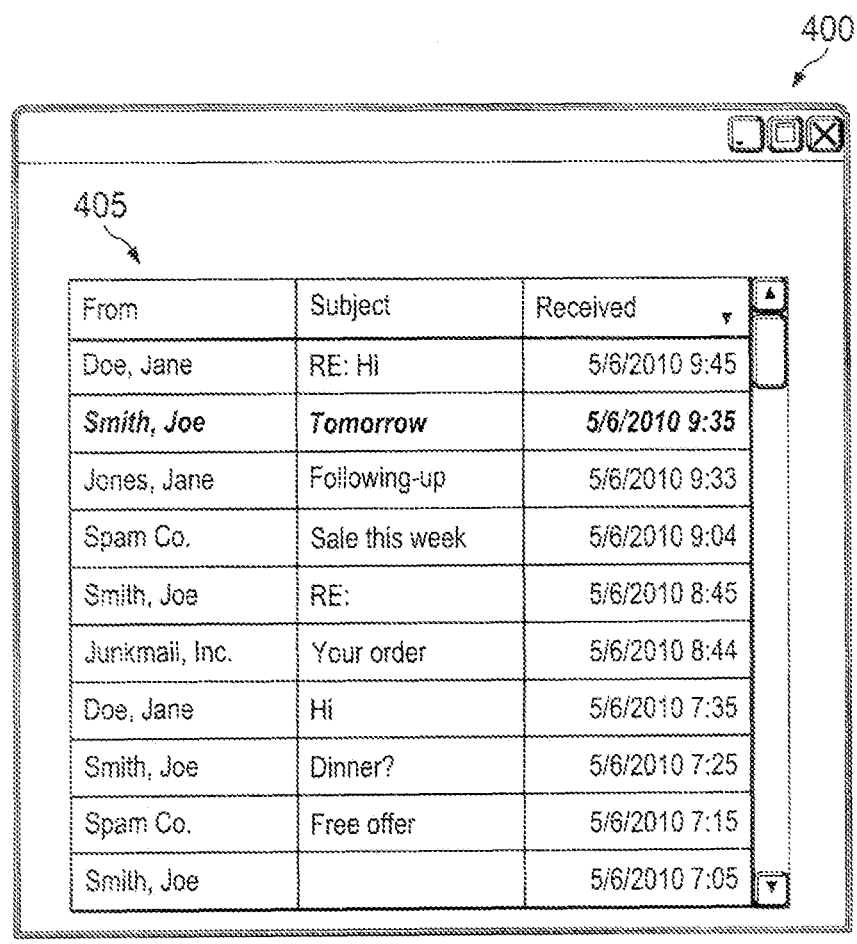
FIG. 4A is an example screenshot of a user interface displaying another example of table data capable of being operated upon by a shared UI framework, such as the UI framework described in connection with FIG. 2.
Figure 4B:
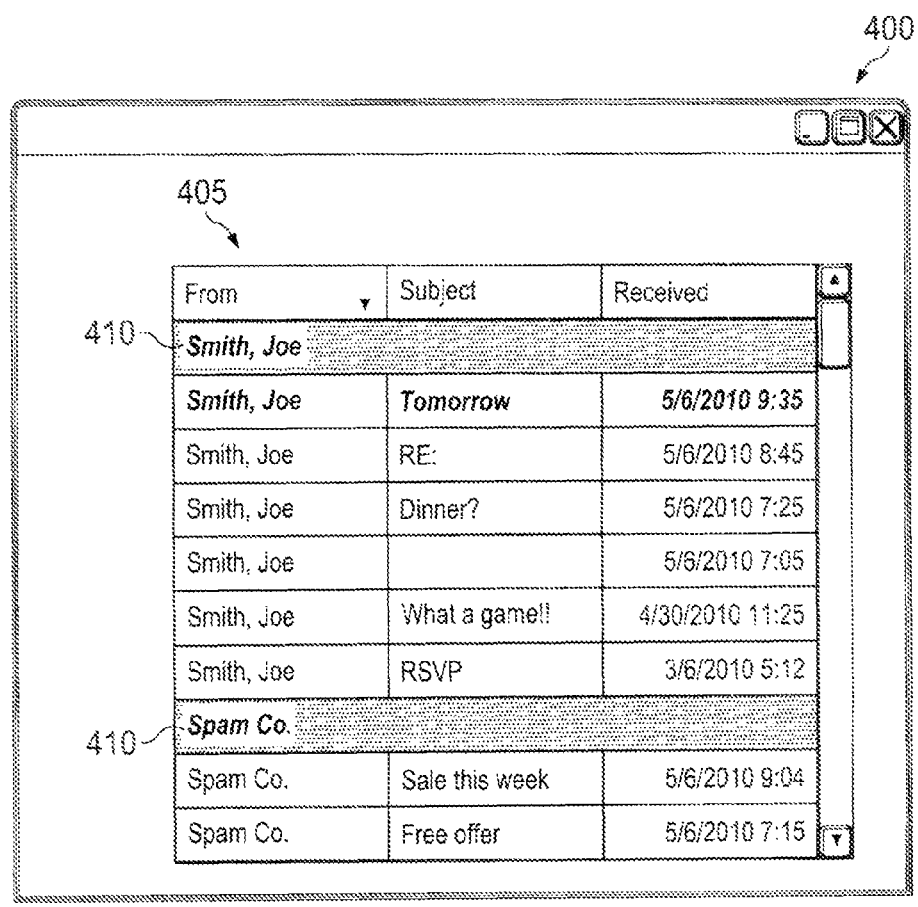
FIG. 4B is an example screenshot of a user interface displaying another example of table data that has been operated upon by a shared UI framework, such as the UI framework described in connection with FIG. 2.

As a further example, illustrated in FIGS. 4A and 4B, an example UI 400 is illustrated of an email inbox table 405. In this particular UI 400, for this particular email program (or service consumer), only ten emails are displayed on the UI 400 at any given time. In FIG. 4A, the email inbox table 405 lists the emails in the order in which they were received by an associated email server. In this example, the email program interfaces with a shared UI framework as the consumer of table operation UI services provided by the framework. The email server, in this example, is the data source interfacing with the UI framework. A user can request to have the email program UI display the emails grouped by sender. The email program requests the UI framework to perform this grouping operation, FIG. 4B representing an example display of the UI following receipt of the email data processed by the UI framework in accordance with the email program's request. As shown in FIG. 4B, ten rows of email data are again presented, with a row dedicated to a header 410 for each of the groupings of emails (by sender name). The UI framework, in performing the grouping operation, can interface with a service behavior controller associated with the email program to determine what portion of the grouped data is to be returned to the email program and in what format (e.g., a maximum of 10 rows with rows dedicated to group headers). The UI framework can consult a received service behavior to make this determination.

The examples of FIGS. 4A and 4B are for purposes of illustration only, and one would appreciate that the types, size, and breadth of UI requirements can vary widely. Rather than providing a one-size-fits all result, communication with a particular UI's service behavior controller 215 allows the UI framework to tailor the returned data 265 to a UI's particular specifications. Additionally, cooperation with a service behavior controller 215 can further enhance the optimization performance of the service controller 205 by allowing the service controller 205 to identify a minimum subset of data that would need to be retrieved from the data source 220, processed by the data source and/or services 225, or delivered to the consumer 210 and still be responsive to the request 250 and permit correct display of the data 265 on the consumer's UI. By identifying what data is to be displayed, framework resources can be more efficiently managed, freeing up the framework 200 to handle other, concurrent UI operation requests from the same or other service consumers 210.

In some implementations, the UI framework 200 and hosted services 225 may adopt principals and/or rules of operation that assist in achieving and maintaining efficient and optimized performance. For instance, services can be directed to read and process only as much data as needed to answer the request. Services, in some instance, need not, and can be directed not to, perform unnecessary calculations. For instance, one or more services 225 may include or use a cache (not shown) to store intermediate or past results in order to fulfill performance requirements and optimize processing of later requests involving overlapping data sets. Utilizing such principals can extend the processing capabilities of the UI framework, allowing it to be used by multiple consumers on large and complex data sets.

Requests from service consumers 210 need not always require the UI framework to coordinate performance of UI operations on data 255 retrieved from a data source 220. Indeed, in some instances, a request from a service consumer can result in the UI framework interfacing with a data source 220 to request a modification to data managed and/or stored by the data source 220. Modifications to data can include updating, changing, deleting, or adding data to a data set provided by the data source 220. For instance, a data consumer application may receive a user request through its UI requesting that certain data, displayed to the user through the UI, be changed in accordance with the user's instructions or interactions. The UI framework 200, acting as an intermediary between the UI and the data source 220, can negotiate the performance of the user's request with the data source 220. In such instances, change information 270 can be transmitted to the data source 220 through, for example, the service controller 205.

In some instances, a service consumer request 250 can result both in the performance of UI operations on data 255 pulled from the data source as well as modifications to data stored at the data source 220. Multiple data sources 220 can be involved in the transaction, with data from one data source being pulled for UI operations and data from another data source being modified in response to the consumer's request 250. Indeed, any service consumer request can involve data from multiple data sources 220, for instance as data 255 from multiple data sources is pulled, by the UI framework, to assemble a data set upon which UI framework services will be performed to produce a processed set of data 265 returned to the consumer 210 for presentation on a UI. The service controller 205 can handle and coordinate each of these transactions between the various data sources 220 in response to a service consumer's request 250.

During or after processing of data 255 by one or more services 225, the data source 220 can additionally signal data changes to the service controller 205 indicating that insertions, deletions, and modifications of certain record values have been made, for example, by the underlying data source manager, the data consumer's underlying application, or another data consumer. Changes signaled by the data source 220 can invalidate any intermediate results or caches of the services. Likewise, the UI framework 200 can ask the data source 220 to insert, delete, or modify rows in connection with performance of its services 225.

In addition to managing and optimizing performance of the UI framework services 225, the service controller 205 can also cooperate and communicate with a field service controller 245 of the UI framework as well as a service configuration controller 235 of the UI framework in connection with providing UI services to consumers. Both controllers 235, 245 can be called on to perform necessary tasks used in responding to consumer requests for UI operation services managed by the service controller 205. Indeed, in some implementations, the functionality of two or more of the service controller 205, field service controller 245, and service configuration controller 235 can be combined into a single framework controller.

A field service controller 245 can be used in connection with one or more services 225 called in connection with the performance of various UI operations on data 255 obtained from a data source 220. A field service controller 245 can provide data conversion functionality, for instance, to convert the data type of data 255. For instance, data retrieved from the data source 220 may have a data type definition that is different or incompatible with either or both of the consumer's UI or the UI services 225 of the framework. Generally, the field service controller 245 performs data translation operations to translate the data type or format between its "external" type (i.e., how the data is presented on the UI) and its "internal" type (i.e., how the data is maintained at the data source 220), according to one or more rules dictating how the translation is performed. In some instances, data translation may be required by a particular UI operation or service 225 in order to properly respond to a request 250. For example, a service may not be able to properly sort or filter a given UI column, where the displayed, external values are time stamps in local time, while the internal values represent the times in normalized universal time (UTC). Accordingly, in some instances, there can be strong cooperation and coupling between the field service controller 245 and one or more services 225 provided through the UI framework 200.

Additionally, data translation can assist in translating data according to regional preferences. For instance, data can be translated based on the regional preferences of the UI and data source 220, including the language, alphabet, currency, units of measurement, date format, etc. For instance, by way of a simplified, non-limiting example, internal data at the data source may store monetary values in Euros while the UI of the service consumer displays the monetary values in US dollars. The field service controller 245 can perform the data translation, either when pulling data from, or writing data to the data source, by applying a current exchange rate converting the values between Euros and US dollars.

A centralized field service controller 245 need only perform data conversion once for a chain of services 225 and service operations. In some instances, a field service controller 245 can be implemented according to the specialized requirements of specific application programming models, for example where data type definitions differ amongst programming models. The requirements can be communicated, in some instances, by the application layer of a service consumer 210. Indeed, while the field service controller 245 is internal to the example UI framework 200 implementation illustrated in FIG. 2, in other examples the data conversion functionality of the field service controller 245 can be provided alternatively, partially, or redundantly by one or more external components, including a service consumer 210, data source 220, service behavior controller 215, or other component or entity. For instance, data conversion functionality can be implemented using an application layer of a service consumer application communicating and operating in cooperation with an internal field service controller 245 through an API.

Each UI service 225 has a corresponding service configuration model 230. A service's service configuration model 230 defines the exact function of a service, including the specific parameters and data range information needed by the service 225 to successfully perform its operation. As an example, the service configuration model 230 of a service for performing a sort table UI operation can, for example, include configuration parameters needed to perform the sort including an identification of the column(s) to be sorted, as well as parameters indicating how the data is to be sorted (e.g., descending/ascending, alphabetically, etc.).

The UI framework 200 can further include a service configuration controller 235 that provides an interface to external service configurators 240, to allow a service configurator 240 to modify or customize, permanently or temporarily, a particular service 225. This can be accomplished by providing service configurators 240 uniform and controlled access to a services' service configuration models 230 through the service configuration controller 235. A service configurator 240 can also create or define initial or default configuration models or configuration model parameters. For instance, a service configurator 240 can define a new configuration model for a new service needed in connection with the UI of a particular service consumer 220. In some examples, service configurators 240 can specify conditional configuration model modifications. For instance, a service configurator 240 can specify that a proposed configuration model modification or customization should be limited to a particular service consumer, data type, data source, etc. Changes to a particular service configuration model 230 can also be limited to apply only during a particular request 250, and modifications to configuration models 230 can take place at runtime, in response to or in connection with a particular request 250 for UI services. Indeed, the service consumer 210, itself, can act as the service configurator 240, and specify a change to a service configuration model in its request for a UI service. Additionally, a service configuration controller 235 can also permit external service configurators 240 to simply read current configuration models 230 of UI services 225 offered through a UI framework 200. Information concerning service configuration models 235 can be used, for example, by service consumers 210 in tailoring their requests 250 in accordance with a particular service configuration model 235.

While the example UI framework illustrated in FIG. 2 is described as containing or being associated with a plurality of elements or controllers, not all elements illustrated within UI framework 200 of FIG. 2 must be utilized in each alternative implementation of the present disclosure. Additionally, one or more of the elements described herein may be located external to UI framework 200, while in other instances, certain elements may be included within or as a portion of one or more of the other described elements, as well as other elements not described in the illustrated implementation. Further, certain elements illustrated in FIG. 2 may be combined with other components, as well as used for alternative or additional purposes in addition to those purposes described herein.

Figure 5:
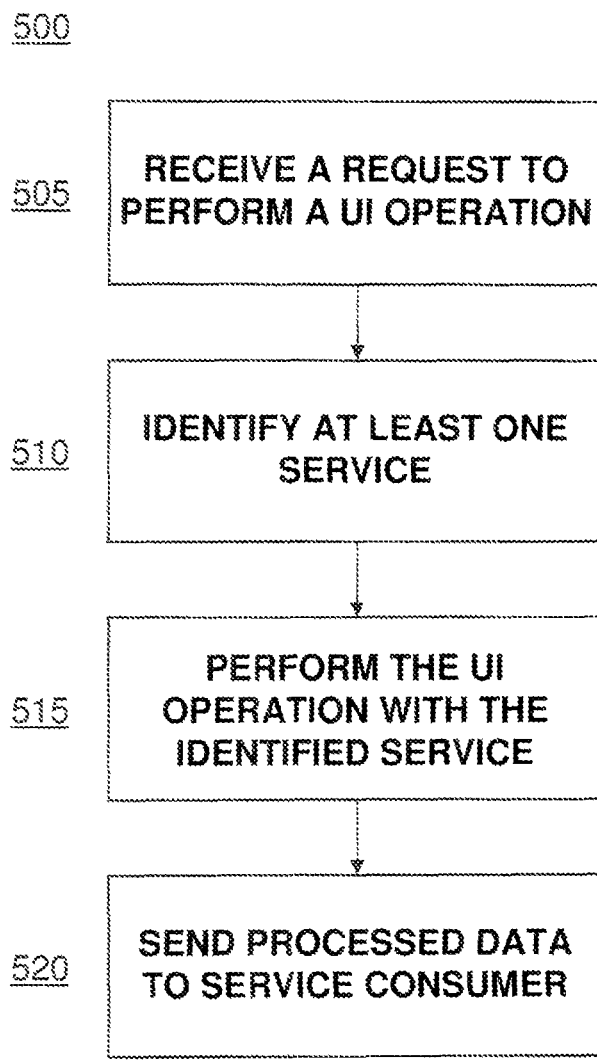
FIG. 5 is a flowchart illustrating an example computer process for providing UI services a shared UI framework, such as the UI framework described in connection with FIG. 2.

Turning to FIG. 5, a flowchart 500 illustrates an example method for providing UI services to a consumer using a shared UI framework, such as the example implementations illustrated and described in connection with FIGS. 1-4B. A request to perform at least one UI operation on a first set of data is received 505, at an application-independent, reusable UI framework. The UI operation can affect the presentation of the first set of data on a user-interface associated with the first application. In some instances, the UI operation can be directed to an operation on table data, such as a sorting, grouping, or filtering operation. The request can be received 505 from a service consumer, such as an application utilizing the UI framework as or in connection with the application's UI layer. At least one service, hosted by the UI framework, is identified 510 in response to the received request 505. The identified service can be adapted to perform the at least one UI operation on the set of data. The identified service can then be used to perform 515 the UI operation on the data set to produce a processed data set. The processed data set can then be sent 520 to the data consumer for presentation on a user-interface associated with the data consumer.

A reusable, shared UI framework can receive multiple requests for UI services from multiple service consumers utilizing UIs of different technologies. Requests fielded by the UI framework from service consumers can involve the same sets of data provided by the same data sources. Where a service has already performed a particular operation on a set of data, the service can cache the result and use the cached result the next time an operation is requested on the set of data, for instance, by a different service consumer. Additionally, requests received from the same service consumer can require data from different data sources.

In some instances, a service provided by a shared UI framework can perform operations on an identified data set on a piece-wise basis. For instance, a large set of data may be identified in a request. The UI framework can divide the set into segments and perform UI operations on each segment to incrementally build the resulting set of processed data for the service consumer. As an example, only a portion of a large set of data, upon which UI operations are to be performed, may be presented on a service consumer's UI at a given time. Accordingly, the UI framework may subdivide a large block of data into smaller segments corresponding to the portion of that data block that can be displayed at a given time on the UI. In another example, the UI framework can identify that framework services have already performed the requested operation on portions of the data block, and cached the results, allowing the UI framework, in this transaction, to restrict performance of the operation to that portion of the block not yet operated upon.

Figure 6:
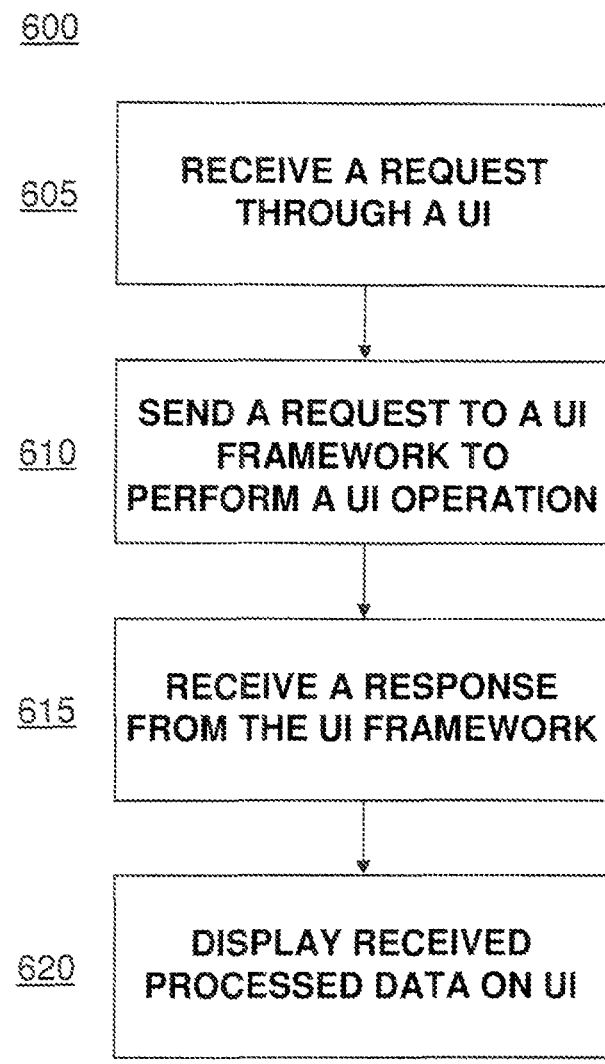
FIG. 6 is a flowchart illustrating an example computer process for consuming UI services provided by a shared UI framework, such as the UI framework described in connection with FIG. 2.

FIG. 6 is a flowchart 600 illustrating an example method for consuming services provided by a shared UI framework. A user request can be received 605, through a user interface presented on a computing device, to perform at least one operation on particular table data. The operation can be a UI operation relating to presentation of at least a portion of the particular table data on the user-interface. A request to perform the at least one operation can be sent 610 to an application-independent, shared UI framework. The request can include identification of the particular table data (e.g., file, table, column, row, and cell names, an identification of the data source providing the data, etc.) and the at least one operation. The particular data can be provided by, and stored in memory of, a data source independent of the shared UI framework. A response can be received 615, from the UI framework, including processed table data. The received response 615 can be responsive to the sent request 605. Processed table data can include at least a subset of the identified particular table data modified in accordance with performance of the at least one operation on the subset by one or more services hosted by the shared UI framework. The UI framework can include implementations similar to those described above. Additionally, the at least one operation can be performed using steps similar to those illustrated and described in connection with FIG. 5 above. Upon receipt of the processed data from the shared UI framework, at least a portion of the processed table data can be displayed 620 on the user interface.

In some instances, the request sent 610 can include other information including information about the data subset requested (e.g., page, start row in a table, end row in table, cell range, etc.), selections (e.g., multi- and single selections; rows, columns, or cell selections in tables, etc.), service configuration model change requests (such as new sort rules, for example), data modification requests (e.g., changes, additions, insertions, and deletions of data), and error information. Likewise, processed data received 615 from the UI framework can include supplemental data communicating aspects of the processed data returned to the requesting consumer (such as a page, start row in a table, end row in table, cell range, index key, etc. corresponding to the data), error information, or confirmation receipts detailing the operations performed, service configuration model changes and service behavior changes made, data modification made at the data source, etc.

Requests sent to a shared UI framework by a service consumer can also (or alternatively) include requests that cause the UI framework to perform other tasks beside UI service operations. For instance, a request sent to the UI framework can cause the UI interface to interface with a data source to modify, add, or delete data managed by the data source. The request can include or be directed to a request to modify a UI framework service's service configuration model. In some instances the request includes a service behavior request. In still other examples, a request can include requests for information from the UI framework, such as information about a service's service configuration model.

Figure 7:
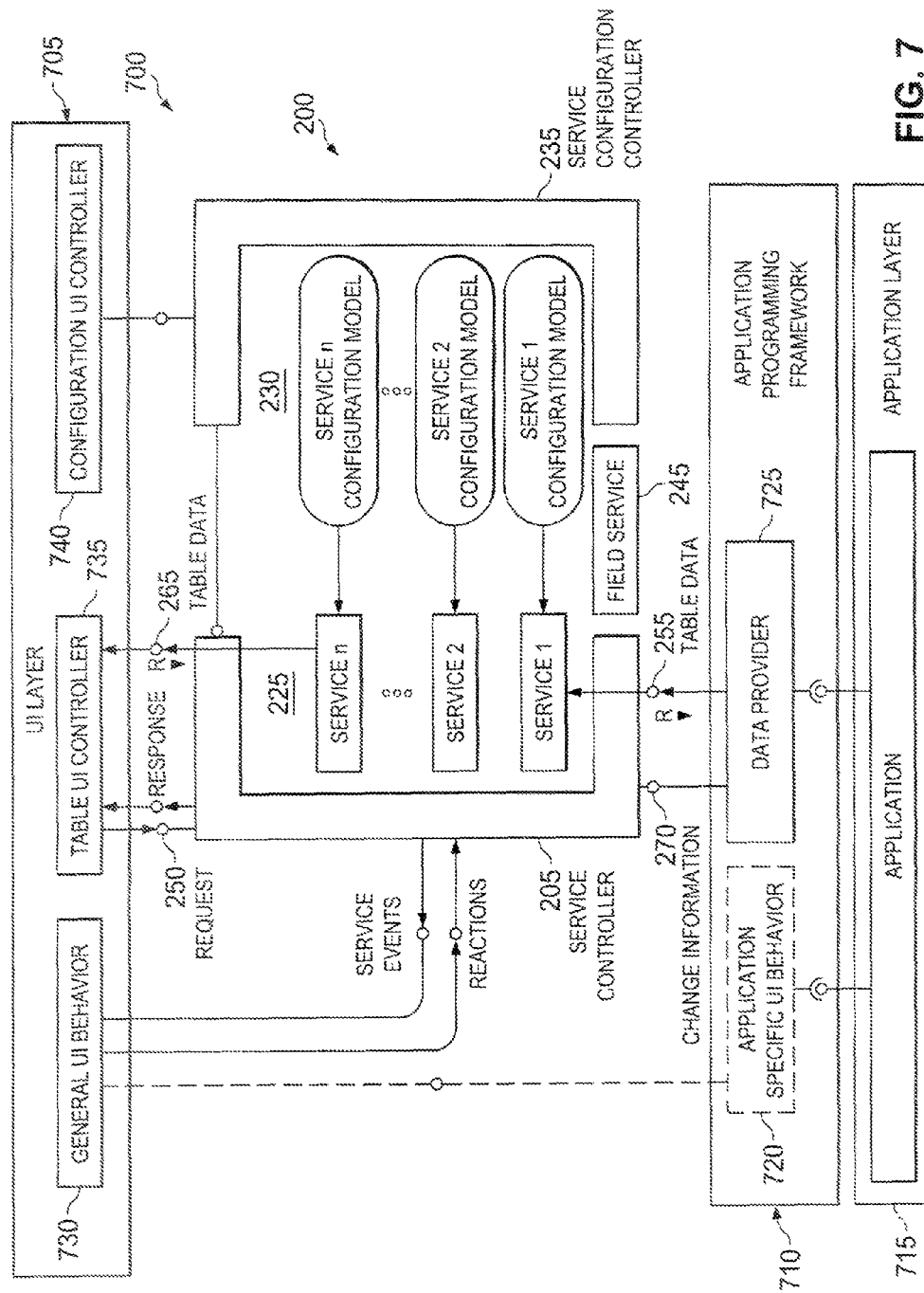
FIG. 7 is a schematic illustration of an example shared UI framework used in connection with an example software application.

FIG. 7 is a schematic illustration 700 of an example implementation of a shared UI framework used in connection with an example software application. In this example, the software application includes a user interface (UI) layer 705, an application programming framework 710, and an application layer 715. The UI interface 200, in this example, is similar to that shown and described in connection with FIG. 2. In this example an application layer 715 interfaces with a corresponding application programming framework 710 adapted to interface with UI behavior control 720 for the application and a data source 725 used in the application. The data source 725, in this example, is a dedicated data source 725 belonging to the application. Nonetheless the UI framework 200, through the service controller 205, interfaces with the data source 725 to access data for use in providing UI operations responsive to service requests 250 from the application.

Continuing with the example of FIG. 7, the UI behavior control 720 can interface with a general UI behavior control 730 belonging to the UI layer 705. The general UI behavior controller 730 can serve as the service behavior controller in transactions between the application and the UI framework 200. The UI layer 705 of the application can also include a UI controller 735 and configuration UI controller 740. In this particular example, the UI framework 200 provides table UI operations for the application and the UI controller 735 is a table UI controller. Requests 250 for services and response to these requests are transmitted between the service controller 205 and the application through the UI controller 735. Processed table data 265 produced in response to the requests 250 can also be returned from the service controller 205 to the UI controller 735. The configuration UI controller 740, in this example, can serve as a service configurator in transactions between the UI framework 205 and the application. The configuration UI controller 740 can interface with the service configuration controller 235 of the UI framework 200.

FIG. 8 is a schematic illustration 800 of another example implementation of a UI framework, this time in connection with a print converter application 805. Using a shared UI framework, such as the UI framework 200 described in connection with FIG. 2, UI operations can be implemented as central services which are independent of a specific software architecture (including user interface architecture and application programming framework), while still achieving optimal performance in the context of distributed software systems, and even mass data scenarios. In such implementations, the UI framework 200 can leverage these UI operations in the back end, for example, to allow background printing and printing preparation of large amounts of data. In this case, a shared UI framework can not only multi-task UI operation requests of multiple applications, but can also simultaneously provide back-end print processing support for other service consumers.

A background spooling system 810 can be used in connection with the print converter 805. The background spooling system 810 can include stored application data 815 (e.g., application data of an application similar to that shown and described in FIG. 7) that can be shared with or provided to a data source 820 interfacing with a service controller 205 of the shared UI framework 200. The print converter 805, in preparing a print job involving data available from the data source 820 can request the UI framework 200 to assemble and perform UI operations on the data to make it suitable for printing. For instance, in response to the print converter's request 250, the UI framework 200 can obtain data, from the data source 820 corresponding to the request 250, convert it to a printable format (for instance, using the field service control 245), assemble and organize the data through UI services 225, and stream the result 265 to the print converter 805, which readies the processed data 265 in a print queue. In some instances, the data source 820 can assist in assembly of the data, by reconstructing the data from original application data 815. Additionally, the spooling system can act as a service configurator 825, referencing stored service configurations 830 to request changes to one or more service configuration models 230 in accordance with the needs of a particular print job.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Other variations are within the scope of the following claims.

What is claimed is:
1. A computer-implemented method comprising:
receiving a request, at an application-independent, reusable user interface (UI) framework, from a first application, to perform at least one first operation on a first set of data relating to presentation of the first set of data on a UI associated with the first application;
receiving, from a data provider, independent of the UI framework, a subset of the first set of data corresponding to the received request;
identifying, in response to the received request, at least one first service, hosted by the UI framework, adapted to perform the at least one first operation on the first set of data;
performing the at least one first operation on the subset of the first set of data using the identified at least one first service to produce a first processed set of data, wherein the at least one first operation is a conversion, using a centralized service controller of the UI framework to execute the identified at least one first service, of the subset of the first set of data including converting at least some values of data in the subset of the first set of data according to regional preferences of the first application, and wherein the centralized service controller performs the at least one first operation once on the first set of data to make the first processed set of data available for use by other operations performed by at least one other particular service hosted by the UI framework; and
sending the first processed set of data to the first application, the first processed set of data adapted for presentation on the UI associated with the first application.

2. The computer-implemented method of claim 1, wherein the first set of data includes table data and the at least one first operation includes a table operation.

3. The computer-implemented method of claim 2, wherein the table operation is at least one of a sorting, filtering, or grouping operation.

4. The computer-implemented method of claim 1, wherein the subset of the first set of data includes all of the first set of data.

5. The computer-implemented method of claim 1, wherein the subset of the first set of data includes less than all of the first set of data.

6. The computer-implemented method of claim 5 further comprising:
identifying a minimum subset of the first set of data that, when processed by the at least one first operation, produces a processed set of data responsive to the received request; and sending, to the data provider, a request for the minimum subset of the first set of data, wherein the data received from the data provider comprises the minimum subset of the first set of data.

7. The computer-implemented method of claim 1 further comprising:
  receiving a second request, at the UI framework, from a second application, to perform at least one second operation on a second set of data relating to presentation of the second set of data on a UI associated with the second application;
  receiving, from a second data provider independent of the UI framework, a subset of the second set of data corresponding to the second request;
  identifying, in response to the second request, at least one second service, hosted by the UI framework, adapted to perform the at least one second operation on the second set of data;
  performing the at least one second operation on the subset of the second set of data using the at least one second service to produce a second processed set of data; and
  sending the second processed set of data to the second application, the second processed set of data adapted for presentation on the UI associated with the second application.

8. The computer-implemented method of claim 1, wherein the subset of the first set of data is received as a plurality of data segments and the at least one first operation is performed individually on each segment in the plurality of segments.

9. The computer-implemented method of claim 1, further comprising:
  identifying that the data provider is capable of performing at least a second operation;
  sending a request to the data provider to perform at least the second operation;
  wherein:
    the request received at UI framework is for performance of at least two operations, including the first operation and the second operation;
    the data provider has performed the at least the second operation on the first set of data prior to receiving the first set of data from the data provider; and
    the identified at least one first service is used to perform at least the first operation on the subset of the received first set of data.

10. The computer-implemented method of claim 1, wherein each service hosted by the UI framework has an associated service configuration model defining the function of the service.

11. The computer-implemented method of claim 10, further comprising:
  receiving a request to modify a first service configuration model associated with the first service;
  modifying the first service configuration model based at least in part on the received request to modify the first service configuration model; and
  wherein performance of the first operation is based at least in part on the modified first service configuration model.

12. The computer-implemented method of claim 1, further comprising sending a data modification request to the data provider to modify, delete, or add data managed by the data provider.

13. The computer-implemented method of claim 12, wherein the data modification request is sent in response to the request from the first application.

14. The computer-implemented method of claim 1, wherein converting the subset of the first set of data includes converting the subset of the first set of data from a first data type to a second data type.

15. The computer-implemented method of claim 14, wherein the second data type is adapted for use by the first application.

16. The computer-implemented method of claim 14, wherein the second data type is adapted for use by the at least one service.

17. The computer-implemented method of claim 1, wherein the request is for performance of a plurality of operations, including the first operation, and a plurality of services hosted by the UI framework are identified in response to the request, each service in the plurality of services adapted to perform at least one of the plurality of operations, wherein the first processed set of data is produced through performance of the plurality of operations on the subset of the first set of data.

18. The computer-implemented method of claim 1, further comprising:
  identifying a particular order for the performance of the plurality of operations; and
  initiating performance of each of the plurality of operations by a corresponding one of the plurality of services according to the identified particular order.

19. The computer-implemented method of claim 1, wherein the UI framework provides print-processing support.

20. A computer-implemented method comprising:
  receiving a user request through a user interface (UI) presented on a computing device, to perform at least one operation on particular table data, the at least one operation relating to presentation of at least a portion of the particular table data on the UI;
  sending a request to perform the at least one operation to the shared UI framework, and wherein the sent request includes an identification of the particular table data and the at least one operation, wherein the particular table data is stored in a memory of a data source independent of the shared UI framework, wherein the at least one operation is a conversion, using a centralized service controller of the shared UI framework to execute an identified at least one service hosted by the shared UI framework and adapted to perform the at least one operation on the particular table data, of a subset of the particular table data including converting at least some values of data in the subset of the particular table data according to regional preferences of an application displaying the UI, and wherein the centralized service controller performs the at least one operation once on the subset of the particular table data to generate processed table data available for use by other operations performed by at least one other particular service hosted by the shared UI framework;
  receiving a response from the shared UI framework including the processed table data; and
  displaying at least a portion of the processed table data on the UI.

21. The computer-implemented method of claim 20, wherein the request to perform the at least one operation includes a service behavior identifying at least one feature of presentations of processed table data on the UI, wherein the received processed table data is produced by the shared UI framework based at least partially on the at least one feature.

22. The computer-implemented method of claim 21, wherein the at least one feature identified in the service behavior can be used by the UI framework to identify a particular portion of the processed table data to be displayed on the UI.

23. The computer-implemented method of claim 20, wherein the request to perform the at least one operation is sent to the shared UI framework over a network, wherein the shared UI framework is hosted by at least one remote computing device.

24. A computer-program product for providing an application-independent, reusable, and shared user interface (UI) framework, the computer-program product comprising computer-readable instructions embodied on tangible, non-transitory media and operable when executed to:
   receive a request from a first application, to perform at least one first operation on a first set of data relating to presentation of the first set of data on a user-interface associated with the first application;
   receive, from a data provider, independent of the UI framework, a subset of the first set of data corresponding to the received request;
   identify, in response to the request, at least one service, hosted by the UI framework, adapted to perform the at least one first operation on the first set of data;
   perform the at least one first operation on the subset of the first set of data using the at least one identified service to produce a first processed set of data, wherein the at least one first operation is a conversion, using a centralized service controller of the UI framework to execute the identified at least one service, of the subset of the first set of data including converting at least some values of data in the subset of the first set of data according to regional preferences of the first application, and wherein the centralized service controller performs the at least one first operation once on the first set of data to make the first processed set of data available for use by other operations performed by at least one other particular service hosted by the UI framework; and
   send the first processed set of data to the first application, the first processed set of data adapted for presentation on the UI associated with the first application.

25. A computer-program product comprising computer-readable instructions embodied on tangible, non-transitory media and operable when executed to:
   receive a user request through a user interface (UI) presented on a computing device, to perform at least one operation on particular table data, the at least one operation relating to presentation of at least a portion of the particular table data on the UI;
   send a request to perform the at least one operation to the shared UI framework, and wherein the request includes an identification of the particular table data and the at least one operation, wherein the at least one operation is a conversion, using a centralized service controller of the shared UI framework to execute an identified at least one service hosted by the shared UI framework and adapted to perform the at least one operation on the particular table data, of a subset of the particular table data including converting at least some values of data in the subset of the particular table data according to regional preferences of an application displaying the UI, and wherein the centralized service controller performs the at least one operation once on the subset of the particular table data to generate processed table data available for use by other operations performed by at least one other particular service hosted by the shared UI framework;
   receive a response from the shared UI framework including processed table data, wherein the processed table data includes at least a subset of the particular table data; and
   display at least a portion of the processed table data on the UI.

* * * * *